C. B. OKLITZ.
HAY TEDDER.
APPLICATION FILED JULY 21, 1920.

1,377,271.

Patented May 10, 1921.
3 SHEETS—SHEET 1.

Inventor
C. B. Oklitz
By his Attorneys
Baldwin & Wight

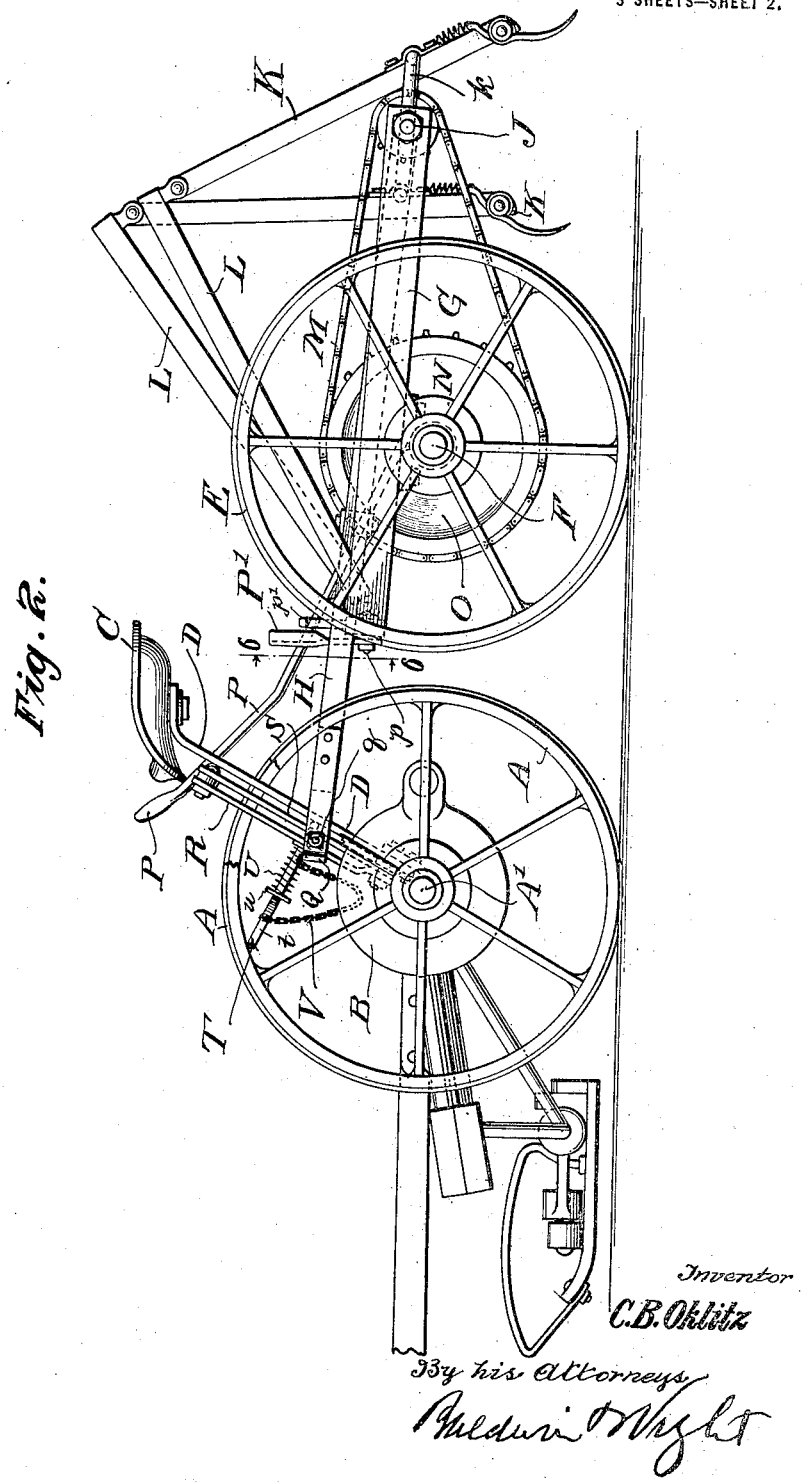

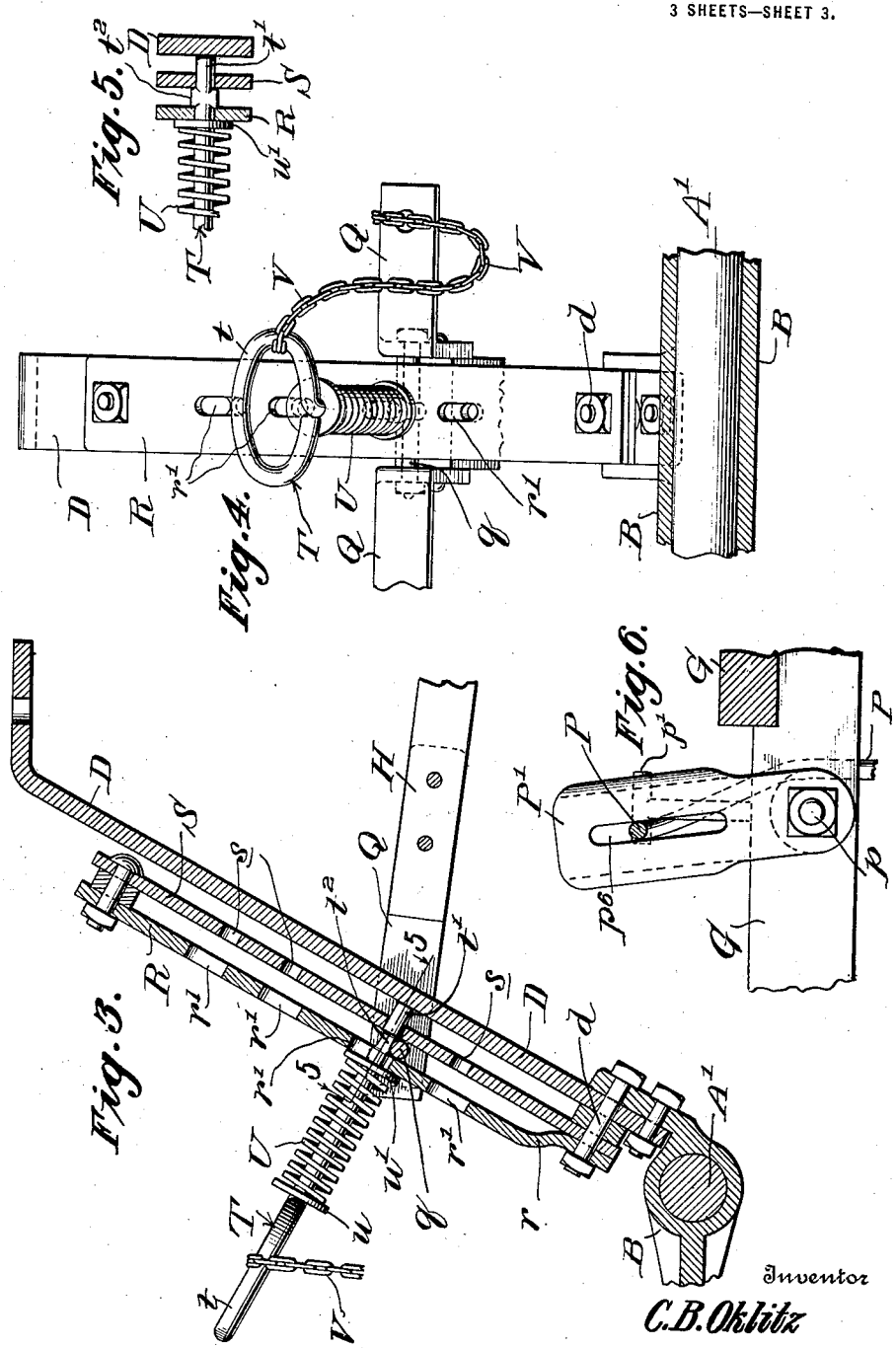

UNITED STATES PATENT OFFICE.

CARL B. OKLITZ, OF ELKHART, INDIANA.

HAY-TEDDER.

1,377,271.

Specification of Letters Patent.   Patented May 10, 1921.

Application filed July 21, 1920. Serial No. 397,936.

*To all whom it may concern:*

Be it known that I, CARL B. OKLITZ, a citizen of the United States, residing at Elkhart, in the county of Elkart and State of Indiana, have invented certain new and useful Improvements in Hay-Tedders, of which the following is a specification.

The principal object of this invention is to provide means for connecting a hay tedder with a mowing machine in order that the grass may be operated upon by the tedder immediately after it is cut.

Ordinarily the cutting and tedding operations are performed by separate machines, but this has many disadvantages, requiring more time of both farm hands and draft animals or tractors and furthermore where the operations are separately performed the draft animals or tractors when passing over the cut grass or hay injure the same, especially in certain classes of grass or hay.

According to my invention I provide a tedder of simple construction, which may be operated by its carrying wheels and which is provided with devices for readily connecting it with mowing machines of ordinary construction.

My improvements are illustrated in the accompanying drawings, in which:

Fig. 2 is a side elevation thereof;

Fig. 3 is a detail view in section, illustrating the manner of connecting the pole of the tedder with the seat standard of a mowing machine;

Fig. 4 is a front elevation of the parts shown in Fig. 3;

Fig. 5 is a detail view of the locking devices employed for connecting the tedder with the mower;

Fig. 6 is a detail view of the devices for operating the clutch mechanism.

Figure 1:
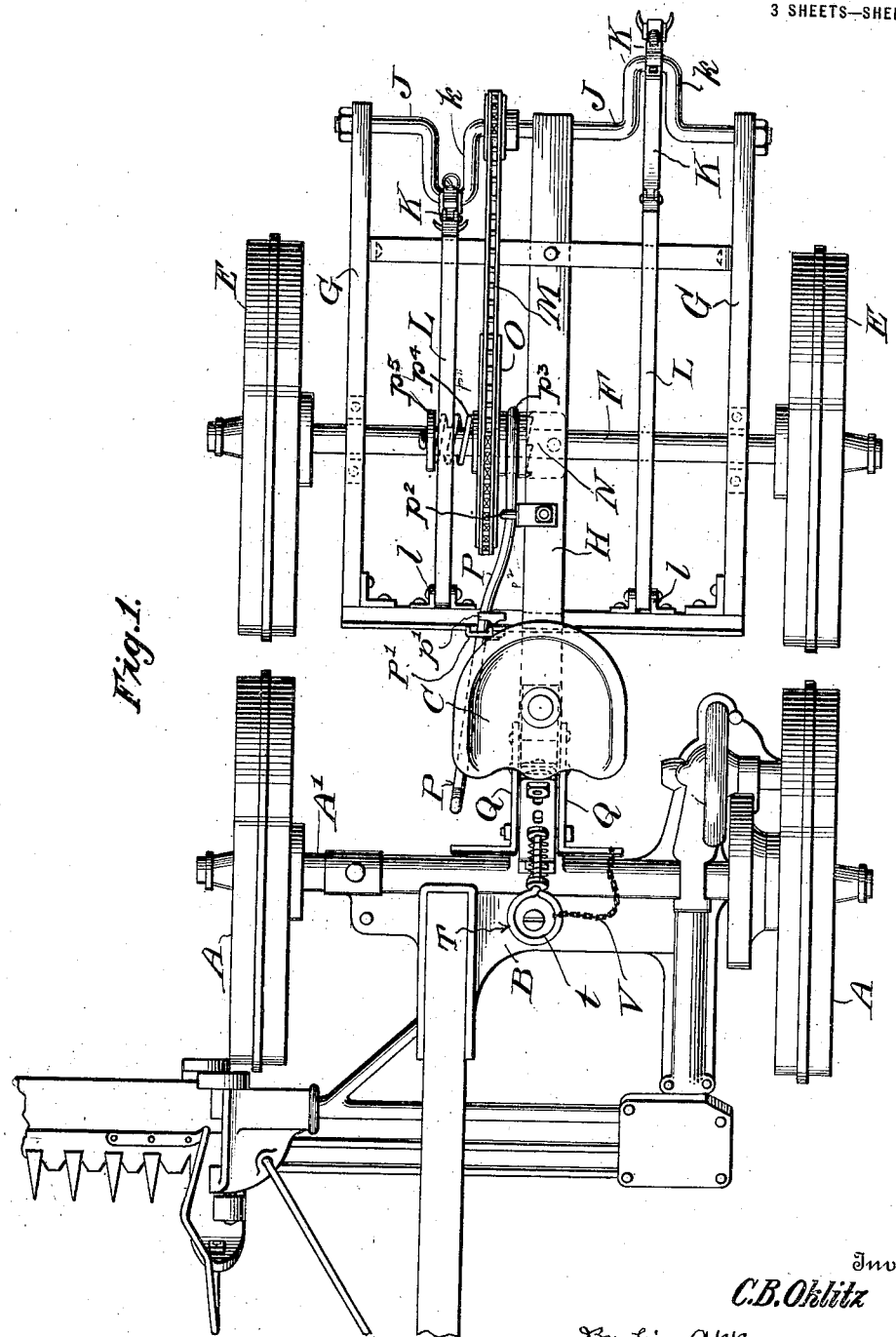
Figure 1 is a plan view of a combined mower and tedder embodying my improvements.

A mower of ordinary construction is shown in the drawings, A being the wheels of the mower, A' the axle, B the mower frame, C the driver's seat and D the seat standard.

The tedder is connected with the mower in the manner hereinafter described. The tedder illustrated comprises wheels E, axle F, frame G, pole H, a crank-shaft J, forks K, pivotally connected with the cranks $k$, and links L, jointed to the upper ends of the forks and pivotally connected to the front of the tedder frame at $l$.

The crank-shaft is connected to the axle F by sprocket gearing M so that as the machine progresses the crank-shaft is operated to actuate the forks. The clutch mechanism N connects the sprocket wheel O with the axle F and the clutch is controlled by a lever P in such manner that the wheels of the tedder may be operatively connected with the crank-shaft or disconnected therefrom. The lever P is pivotally connected with the frame at $p^2$ and it is connected with one member of the clutch N at $p^3$, this member being adapted to slide on the axle F and being pressed in one direction by a spring $p^4$, which surrounds the axle and bears against the clutch and also against a plate $p^5$ secured to the axle. The lever P extends through a guide frame P' (Fig. 6), pivoted to the frame G at $p$. This guide frame is slotted at $p^6$, as shown in Fig. 6 to permit the lever to pass through it and to permit it to have a sliding movement in the guide frame. Adjacent and in rear of the guide frame P' there is a stop $p'$, consisting of a vertical portion and an upper headed portion. The lever P is adapted to pass under the headed portion of the stop. When the front end of the lever is moved toward the pole or tongue the sliding clutch member is thrown out of connection with the clutch member which is rigid with the axle and the lever may be held in place by engaging the stop $p'$. When it is desired to connect the two clutch members the lever is moved out of engagement with the stop and its front end moved away from the tongue or pole. At this time the spring $p^4$ causes the sliding clutch member to engage the stationary clutch member and the tedders are then operated as the machine moves forward.

In order to connect the tedding machine with the mower I secure to the front end of the pole H two angle plates Q, which have a space between them to receive the standard D of the mower seat and these plates carry a cross-piece $q$.

In order to connect the tedder pole to the seat standard of the mower I secure to the seat standard D at $d$ two bars R and S, one of which, R, is bent at $r$, while the other is straight. The front bar R is formed with oblong holes $r'$ and the rear bar S is formed with round holes $s$. These holes are adapted to receive a key T, having a looped outer end $t$ and an inner end having a round portion $t'$, adapted to enter the holes $s$, and a flattened portion $t^2$, adapted to pass through the oblong holes $r'$ but not into the holes $s$. The key carries a spring U, which bears against the washer $u$ next the looped end $t$ of the key and a washer $u'$ at the inner end of the key, which is held in place by the flattened portion of the key. The arrangement is such that the inner end of the key may be passed through any one of the holes $r'$ and into any one of the holes $s$. In doing this the spring U is put under compression. By then giving the key a half turn the flattened portion thereof may be arranged crosswise of the hole $r'$ and in this way the key is held in place in the bars R and S and cannot be withdrawn therefrom. Furthermore, the spring U being under compression prevents the key from being turned accidentally. In order that the key may not be displaced, it is connected with the tedder frame by a chain V.

It will be understood that the bars R and S may be readily attached to the seat standard of any mowing machine, no change in the mower machine being necessary other than to drill a hole to receive the connecting bolt $d$ and the devices at the front end of the pole of the tedder are of the simplest character, enabling me to very easily connect the tedder with the mower. The bars R and S carry between them the cross-piece $q$, which serves to so connect the tedder with the mower that it may be drawn forward. These devices also have another function. By adjusting the key vertically in the holes $r'$, $s$, the vertical position of the forks may be changed or they may be held at the desired elevation and prevented from digging into the ground. It will be observed that the cross-piece $q$ is below the key and the weight of the rear end of the tedder, which would tend to lower the forks and lift the front end of the pole, is prevented from doing this by reason of the connections above specified.

I claim as my invention:

1. A combined mower and tedder comprising a tedding machine having forks and means for actuating them, a pole extending forwardly from the tedder, a seat standard on the mowing machine adapted to connect with the pole of the tedder, a cross-piece carried by the tedder pole and a key supported by the seat standard and extending across said cross-piece.

2. The combination with the pole of a tedding machine having a cross-piece at its front end, the seat standard of a mowing machine, plates secured to said standard and having a series of key-receiving holes and a key adapted to enter said holes and to extend across said cross-piece.

3. A mowing machine having a seat standard carrying a front plate formed with oblong holes and a back plate formed with round holes, a key having a cylindrical inner end and a flattened adjacent portion and a tedder pole having a cross-piece extending between said plates and beneath the key.

4. A tedding machine having a pole provided with plates having a space between them to receive the seat standard of a mowing machine and provided with a cross-piece, a front plate formed with oblong holes, a rear plate formed with round holes and which are arranged on opposite sides of the cross-piece and a key extending into said holes over the cross-piece, and means for attaching said front and rear plates to the seat standard of a mowing machine.

In testimony whereof, I have hereunto subscribed my name.

CARL B. OKLITZ.